US010655452B2

(12) United States Patent
Khalaj Amineh et al.

(10) Patent No.: US 10,655,452 B2
(45) Date of Patent: May 19, 2020

(54) INSPECTION OF PIPES WITH BUCKLING EFFECTS

(71) Applicant: Halliburton Energy Services, Inc., Houston, TX (US)

(72) Inventors: Reza Khalaj Amineh, Houston, TX (US); Burkay Donderici, Pittsford, NY (US); Luis Emilio San Martin, Houston, TX (US); John Andrew Quirein, Georgetown, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 57 days.

(21) Appl. No.: 16/300,463

(22) PCT Filed: Jul. 8, 2016

(86) PCT No.: PCT/US2016/041559
§ 371 (c)(1),
(2) Date: Nov. 9, 2018

(87) PCT Pub. No.: WO2018/009221
PCT Pub. Date: Jan. 11, 2018

(65) Prior Publication Data
US 2019/0145247 A1 May 16, 2019

(51) Int. Cl.
*G01V 3/10* (2006.01)
*E21B 47/08* (2012.01)
(Continued)

(52) U.S. Cl.
CPC ............ *E21B 47/082* (2013.01); *E21B 47/00* (2013.01); *E21B 47/124* (2013.01); *E21B 49/00* (2013.01);
(Continued)

(58) Field of Classification Search
CPC ... G01V 3/10; G01V 3/28; G01V 3/38; G01V 3/18; G01V 3/20; G01V 3/22; G01V 3/24;
(Continued)

(56) References Cited

U.S. PATENT DOCUMENTS

2006/0106588 A1 5/2006 Mitchell
2011/0185807 A1 8/2011 Albrecht et al.
(Continued)

OTHER PUBLICATIONS

PCT Application Serial No. PCT/US2016/041559, International Search Report, dated Apr. 10, 2017, 3 pages.
(Continued)

*Primary Examiner* — Thang X Le
(74) *Attorney, Agent, or Firm* — Gilliam IP PLLC

(57) ABSTRACT

Apparatus and methods to evaluate a pipe structure taking buckling into account can be implemented in a variety of applications. Responses can be measured at a set of receivers of a tool in response to exciting the pipe structure with one or more electromagnetic signals transmitted from a set of transmitters of the tool. The set of receivers and the set of transmitters can be located within the pipe structure. Circuitry can be used to determine the presence of buckling of the pipe structure based on comparison of the measured responses with one or more forward models of the pipe structure. The pipe structure may be associated with a well site, such as, for example, a casing structure for a production well.

20 Claims, 12 Drawing Sheets

(51) Int. Cl.
*G01V 3/38* (2006.01)
*E21B 47/00* (2012.01)
*E21B 47/12* (2012.01)
*E21B 49/00* (2006.01)

(52) U.S. Cl.
CPC .............. *G01V 3/10* (2013.01); *G01V 3/38* (2013.01); *E21B 47/0006* (2013.01)

(58) Field of Classification Search
CPC . G01V 3/26; G01V 3/30; G01V 3/265; G01V 3/02; G01V 3/04; G01V 3/06; G01V 3/104; G01N 27/20; G01N 27/82; G01N 27/223; G01N 33/246; G01R 27/18; G01R 27/20
See application file for complete search history.

(56) References Cited

U.S. PATENT DOCUMENTS

| | | |
|---|---|---|
| 2012/0179428 A1 | 7/2012 | Dykstra et al. |
| 2014/0189497 A1 | 11/2014 | Bonavides et al. |
| 2015/0285607 A1* | 10/2015 | Helmore ................ E21B 47/02 33/558.2 |
| 2016/0160629 A1* | 6/2016 | Donderici ........... E21B 47/0006 324/238 |
| 2016/0187523 A1 | 6/2016 | Sanmartin et al. |
| 2017/0038493 A1* | 2/2017 | Wu ..................... E21B 47/0905 |

OTHER PUBLICATIONS

PCT Application Serial No. PCT/US2016/041559, International Written Opinion, dated Apr. 10, 2017, 6 pages.
EP Application No. 16908338.3, Supplemental European Search Report dated Feb. 4, 2020, 9 pages.

* cited by examiner

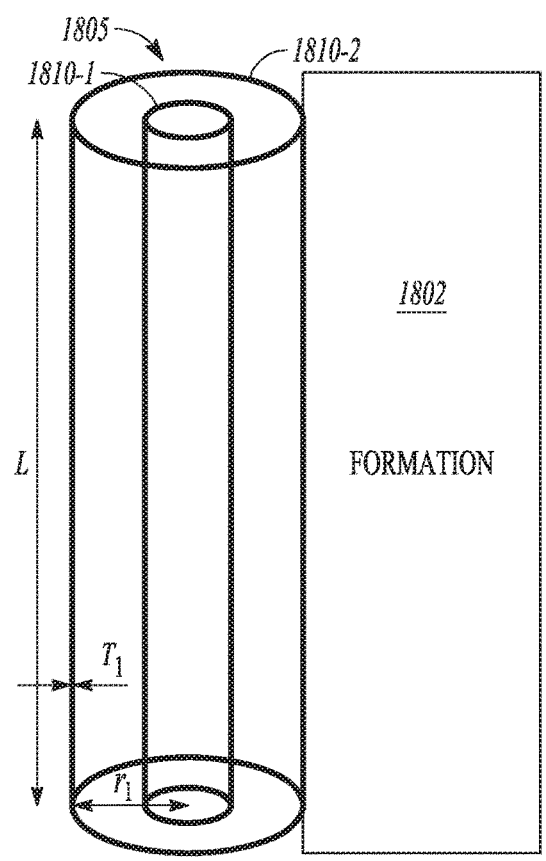
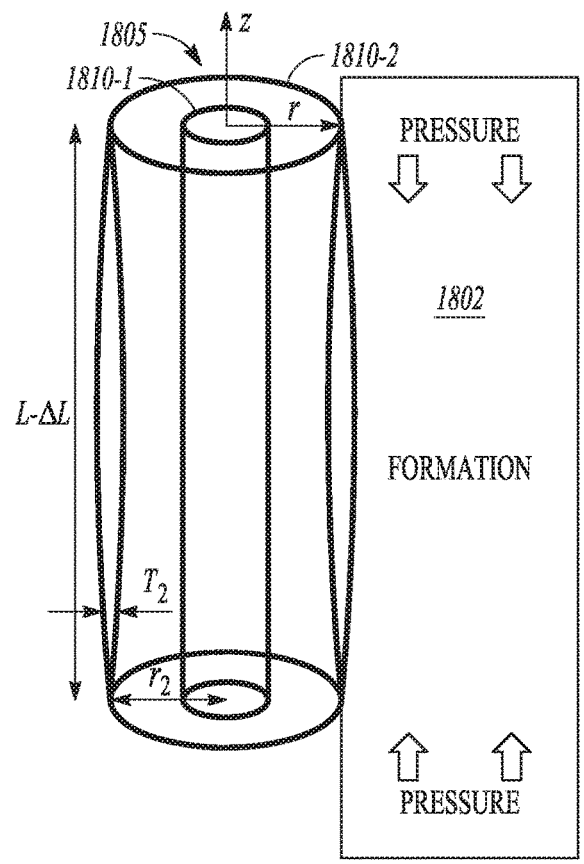
FIG. 17                    FIG. 18

INSPECTION OF PIPES WITH BUCKLING EFFECTS

TECHNICAL FIELD

The present invention relates generally to apparatus and methods with respect to measurements related to oil and gas exploration.

BACKGROUND

Monitoring the condition of production and casing strings is crucial in oil and gas field operations. Electromagnetic (EM) techniques are common in inspection of these components. One major EM technique operates based on producing and sensing eddy current (EC) in these metallic components. In the EC technique, a transmitting coil emits a primary field into the pipes. These fields produce eddy currents in the pipes. These currents, in turn, produce secondary fields. Characterization of the pipes from the EC technique is performed by measuring and processing these secondary fields. In the field, tubes/casing may have the problem of "buckling," which refers to the deformation of these components due to the thermal or pressure loads or formation compaction. Conventional inspection software assumes a certain pipe profile baseline and only shows the thicknesses variation as part of the inversion.

BRIEF DESCRIPTION OF THE DRAWINGS

FIG. 17 is a representation of pipes before formation compaction, in accordance with various embodiments.

FIG. 18 is a representation of pipes after formation compaction, in accordance with various embodiments.

DETAILED DESCRIPTION

The following detailed description refers to the accompanying drawings that show, by way of illustration and not limitation, various embodiments in which the invention may be practiced. These embodiments are described in sufficient detail to enable those skilled in the art to practice these and other embodiments. Other embodiments may be utilized, and structural, logical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

Since EM sensing can provide continuous, in situ measurements of the integrity of tubing/casing, there has been considerable interest in using EM in cased borehole monitoring applications. However, the available tools commonly do not employ detailed inversion procedures for evaluation of multiple pipes. They rely on simple interpretations of either the frequency-domain response or the time-domain decay response. One corrosion inspection tool, for example, provides estimates of the total thickness of the casings, employing multiple frequency-domain data acquisitions and interpretations. Azimuthal resolution is achieved via the use of multiple receivers distributed along the azimuthal direction. Other corrosion inspection tools analyze the time-domain decay response to characterize the tubing plus casing with azimuthally symmetrical transmitters and receivers. None of these tools provide inversion results while taking the buckling effects into account.

In various embodiments, a "buckling" inversion that takes the buckling effects into account with proper inversion algorithms can be implemented. Such a buckling inversion can provide a mechanism to detect and evaluate the local deformations of the tubing or casings due to the buckling; to consider a change in the number of pipes, which covers cases where buckling creates more pipes in a cross-section, or less if it tears the pipes; to take into account change in the diameter of the pipes to cover expansion or temperature effects; to take into account change in the thickness of the pipes due to pressure effects on a local section of the pipes; and to use an EM technique that is not sensitive to borehole fluid and its salinity but only the pipes that are magnetic material.

Figure 1:
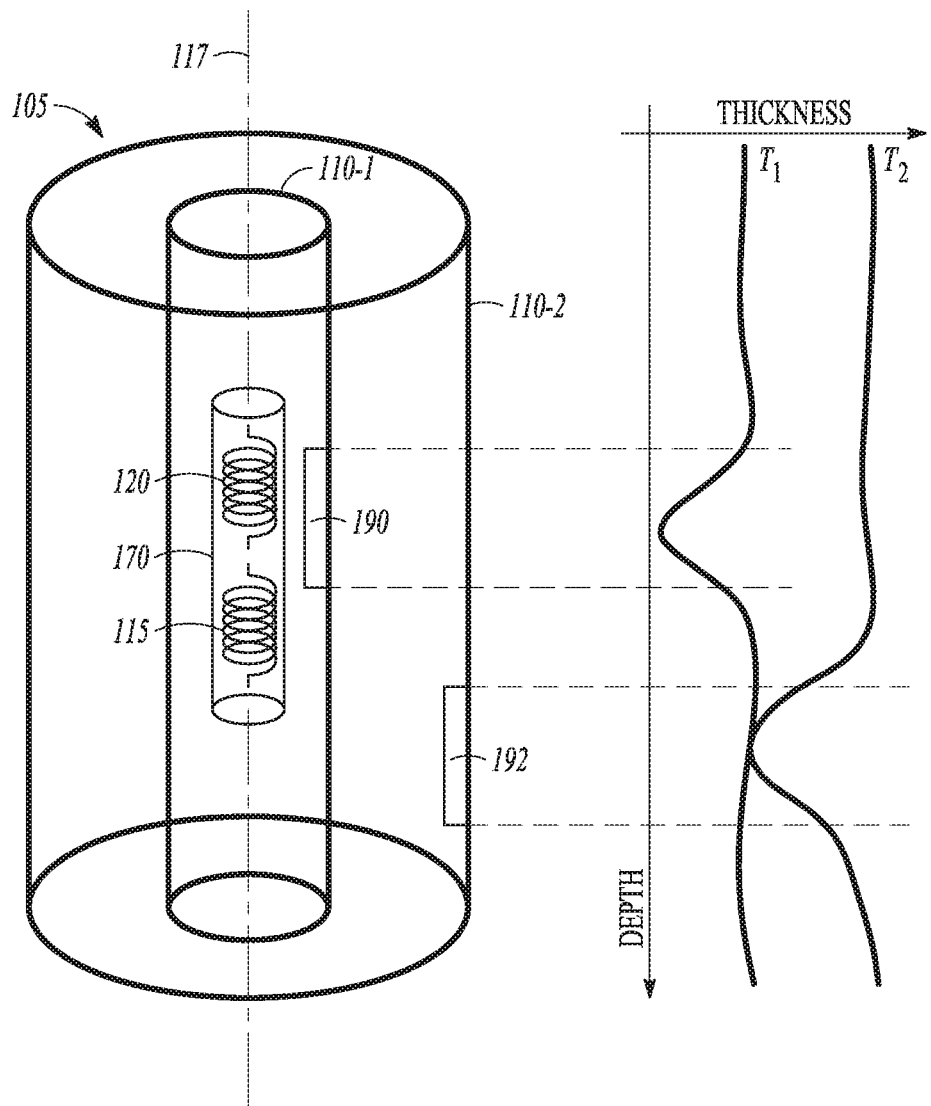
FIG. 1 is a representation of defects in pipes represented by plots of thickness as a function of depth, in accordance with various embodiments.

Conventional pipe inspection softwares provide thickness of the tubing and casing without taking into account the bucklings of the pipes. FIG. 1 is a representation of defects in pipes represented by plots of thickness as a function of depth. FIG. 1 illustrates an arrangement of pipes 110-1 and 110-2 with pipe 110-1 nested within pipe 110-2 in pipe structure 105. Pipe 110-1 may be a tubing having a thickness ($T_1$), a magnetic permeability ($\mu_1$), and electrical conductivity ($\sigma_1$). Pipe 110-2 may be a casing having a thickness ($T_2$), a magnetic permeability ($\mu_2$), and electrical conductivity ($\sigma_2$). The arrangement of pipes 110-1 and 110-2 is an example of a multi-pipe structure. However, multi-pipe structures are not limited to two pipes. Defect 190 in pipe 110-1 and defect 192 in pipe 110-2 are detected as variations in thickness $T_1$ of pipe 110-1 and thickness $T_1$ of pipe 110-2, respectively.

Herein, a multi-pipe structure is a structure having a set of two or more pipes nested within each other, the set having an innermost pipe and an outermost pipe, where the innermost pipe has the smallest outer diameter of the pipes of the set, the outermost pipe has the largest outer diameter of the pipes of the set, and the remaining pipes of the set have outer diameters of value greater than the value of the outer diameter of the innermost pipe and less the than the value of the outer diameter of the outermost pipe with each pipe of the set having a different outer diameter with respect to the other pipes of the set. At a point on a reference axis within the innermost pipe of the set in the longitudinal direction of the innermost pipe, a plane perpendicular to the reference axis intersects the pipes of the multi-pipe structure. In various embodiments, a multi-pipe structure can be realized by a set of concentric pipes. However, a multi-pipe structure is not limited to a set of concentric pipes. The term pipe includes a number of structures such as a casing, a tubing, or other similar component. A multi-pipe structure can include combinations of casings, tubings, or other similar components.

The pipe structure 105, which is a multi-pipe structure, may be located in a borehole at a well site. Though, FIG. 1 shows two pipes, the pipe structure 105 may include more or less than two pipes. A transmitter 115 and a receiver 120 of a measurement tool 170 can be operated to inspect the pipes of the pipe structure 105 to characterize and/or evaluate the pipe structure 105 and its individual pipes. The transmitter 115 and the receiver 120 can be arranged on an axis 117 of the measurement tool 170. The axis 117 may coincide with the axis of the pipe structure 105. The measurement tool 170 can be moved along an axis that coincides with the axis 117 of the measurement tool 170, which can be a longitudinal axis of the measurement tool 170. The axis 117 of the measurement tool 170 with respect to the receiver 120 and the transmitter 115 can be taken as a reference axis to evaluate pipe structure 105. The transmitter 115 and the receiver 120 can be moved along the longitudinal axis of innermost pipe 110-1 to make measurements at different depths. Wireline arrangements, or other conveyance techniques such as slickline, coiled tubing, drill pipe, downhole tractor, or the like, can be used to dispose the transmitter 115 and the receiver 120 in the pipe structure 105 below the earth's surface at a well site.

Movement along the longitudinal axis 117 of the measurement tool 170 may be conducted within the pipe structure 105 parallel to the longitudinal axis of the pipe structure 105. Alternatively, the transmitter 115 and the receiver 120 may be realized as a number of transmitters and receivers within the pipe structure 105 disposed along an axis coinciding with the axis of the measurement tool 170 at different depths from the earth's surface.

Figure 2:
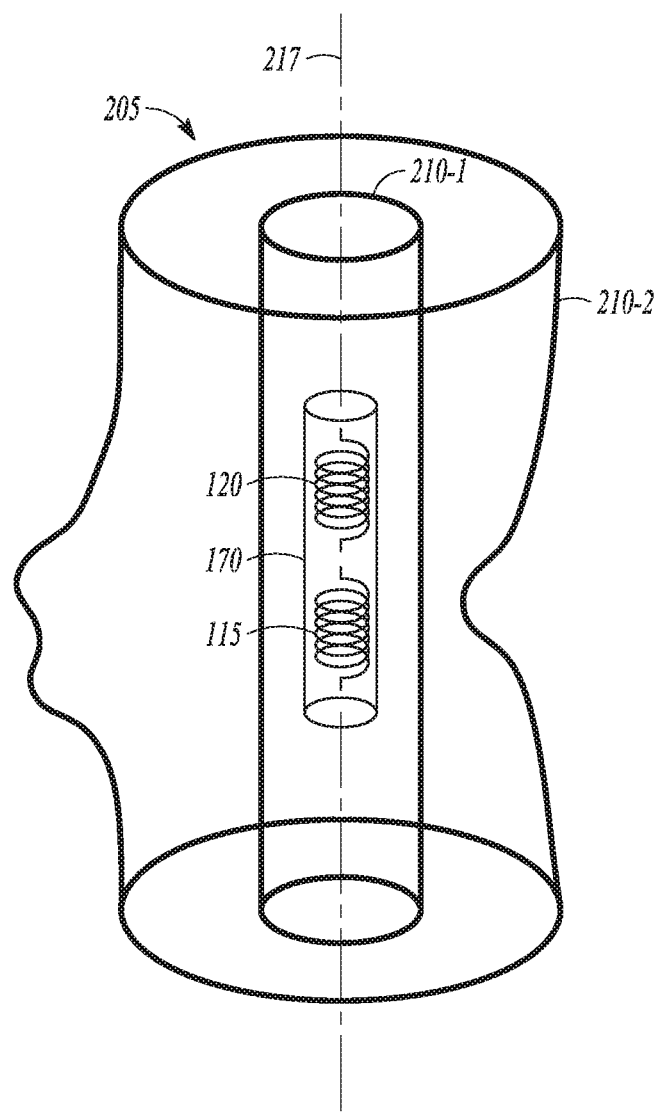
FIG. 2 is a representation of an outer pipe affected by buckling, in accordance with various embodiments.

FIG. 2 is a representation of an outer pipe affected by buckling. This buckling may not be characterized properly in inspection tools that deal only with thickness variations. FIG. 2 illustrates an arrangement of pipes 210-1 and 210-2 with pipe 210-1 nested within pipe 210-2 in pipe structure 205, where outer pipe 210-2 is affected by buckling. Pipes 210-1 and 210-2, similar to the pipe structure 105 of FIG. 1, have properties of thickness, magnetic permeability, and electrical conductivity, which may be investigated with the transmitter 115 and the receiver 120 of the measurement tool 170 on axis 217 as discussed above with respect to FIG. 1.

Figure 3:
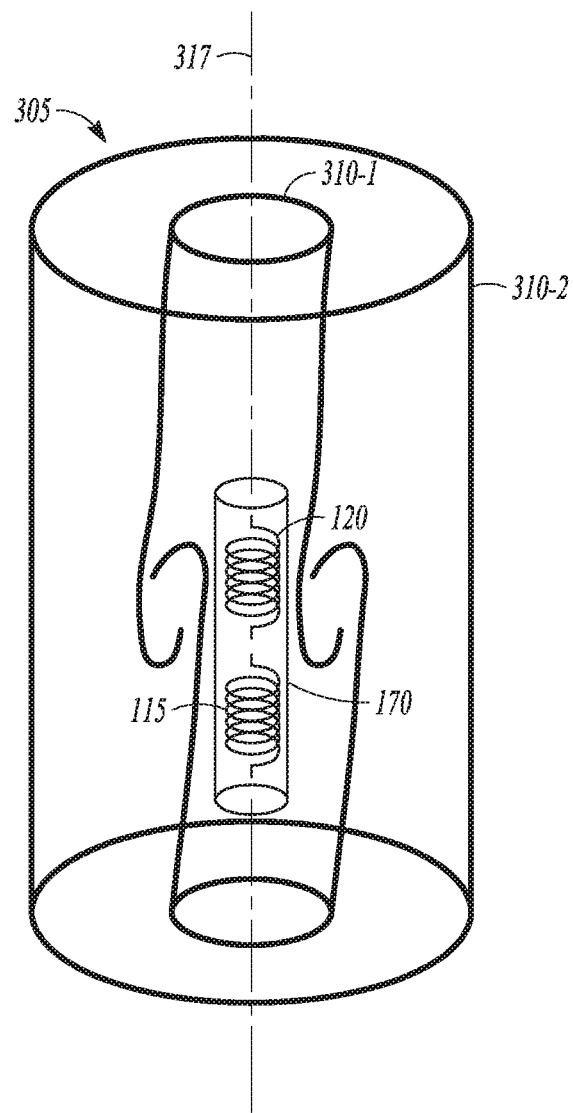
FIG. 3 is a representation of an inner pipe affected by buckling, in accordance with various embodiments.

FIG. 3 is a representation of an inner pipe affected by buckling. This buckling may not be characterized properly in inspection tools that deal only with thickness variations. FIG. 3 illustrates an arrangement of pipes 310-1 and 310-2 with pipe 310-1 nested within pipe 310-2 in pipe structure 305, where inner pipe 310-1 is affected by buckling. Pipes 310-1 and 310-2, similar to the pipe structure 105 of FIG. 1, have properties of thickness, magnetic permeability, and electrical conductivity, which may be investigated with the transmitter 115 and the receiver 120 of the measurement tool 170 on axis 317 as discussed above with respect to FIG. 1.

Consider tubing deformation due to various buckling effects. Various effects arise from change of temperature and pressure in a tubing in different working conditions: piston effect (length changes), spiral effect (pressure on the two ends of the tubing), expansion effect (differential pressure inside and outside the columns), and temperature effect (temperature changes).

Figure 4:
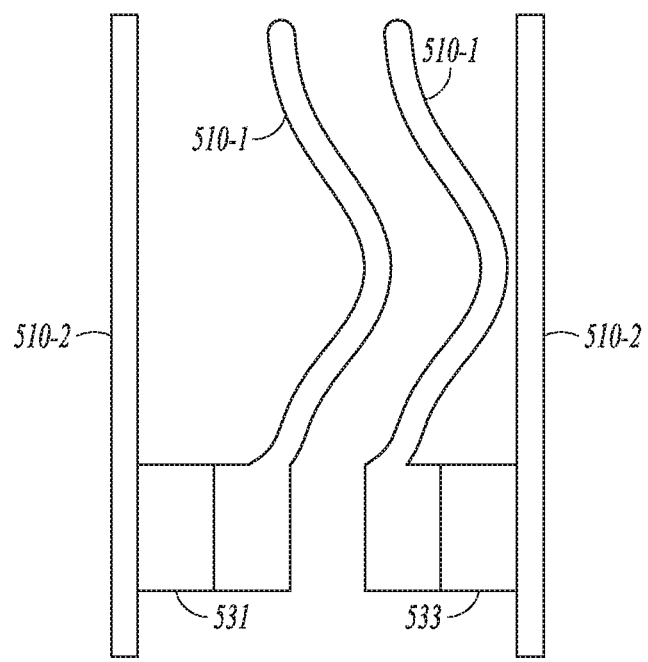
FIGS. 4-6 are representations of various deformation effects of the tubing due to temperature and pressure effects, in accordance with various embodiments.
Figure 5:
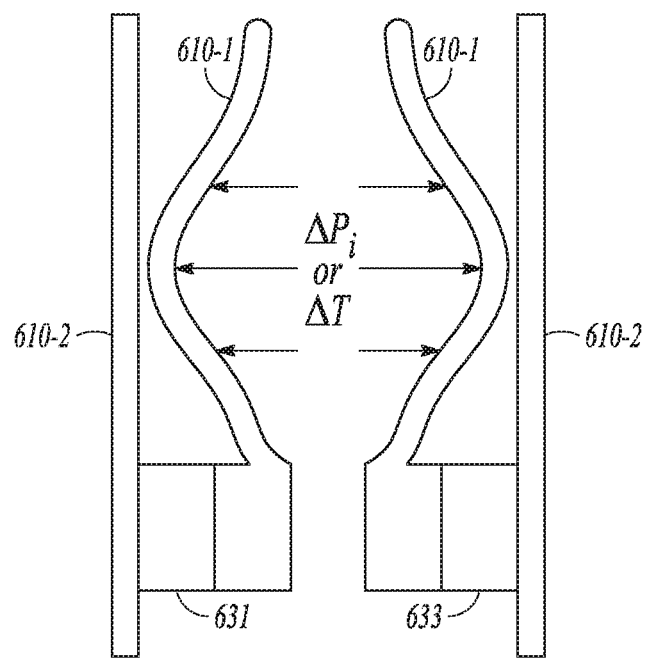
Figure 6:
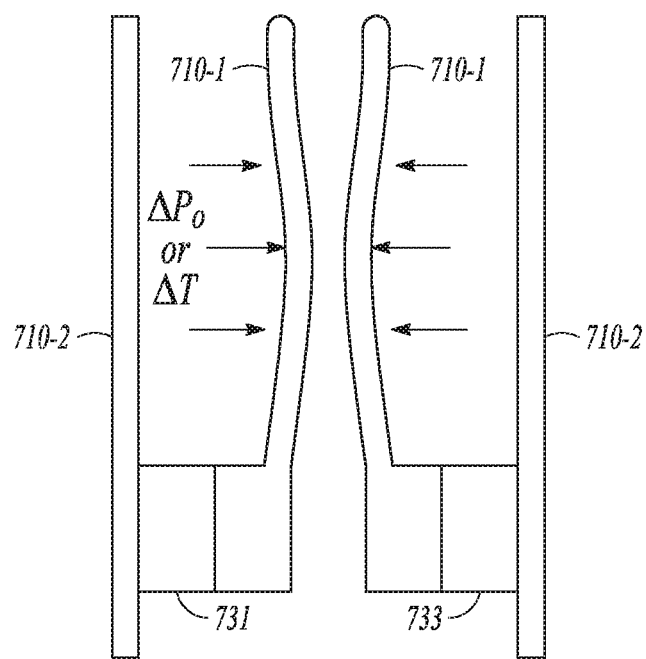
Figure 9:
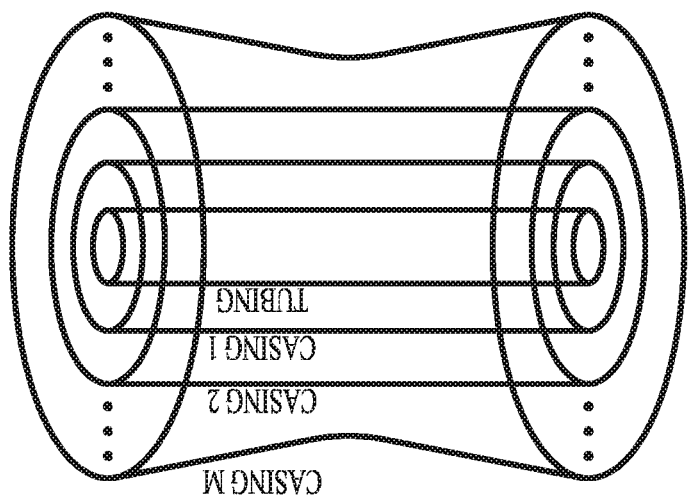
FIGS. 7-12 are representations of various effects that can occur on a casing for deformation of the casing due to the formation compaction effects, in accordance with various embodiments.
Figure 8:
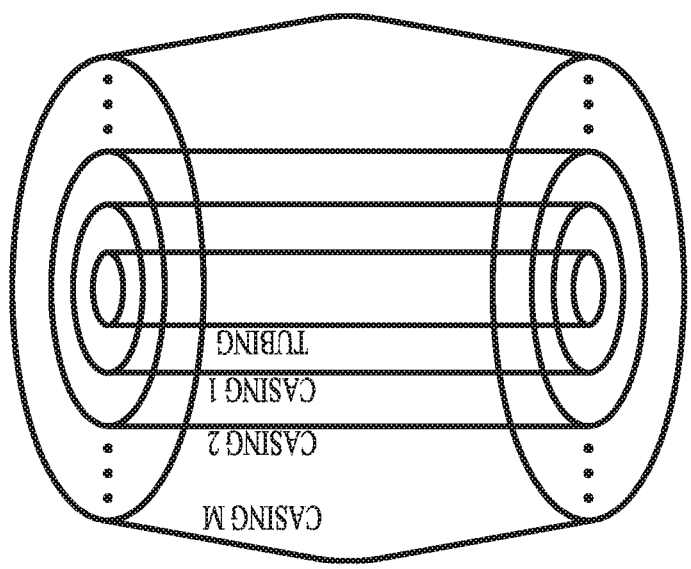
Figure 7:
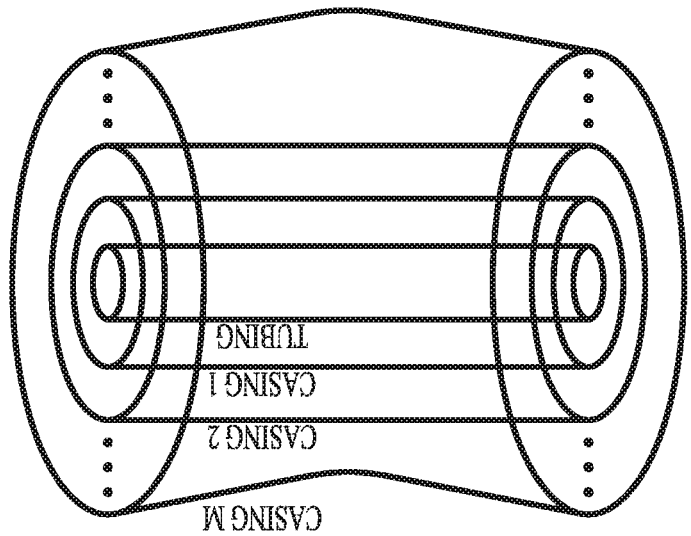
Figure 12:
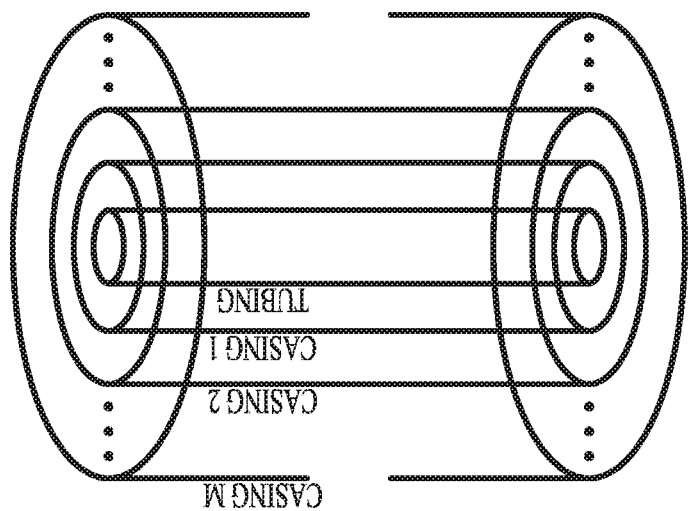
Figure 11:
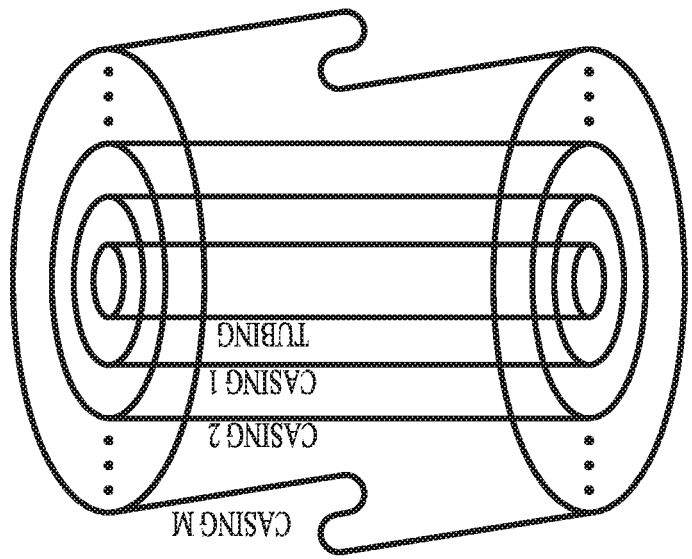
Figure 10:
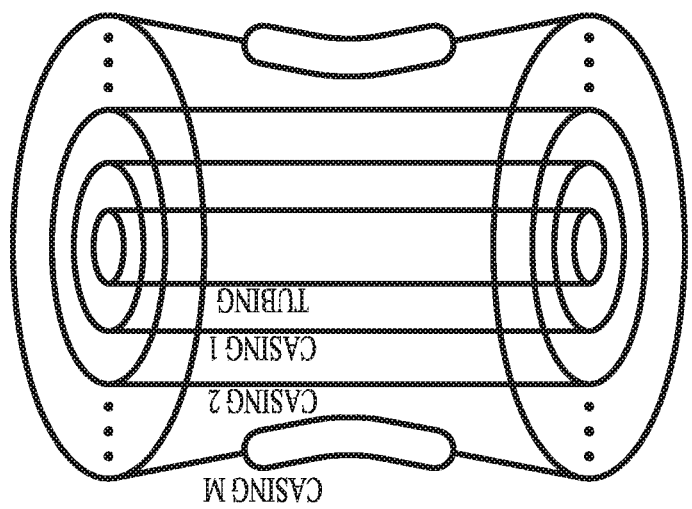

FIGS. 4-6 present various deformation effects on a tubing due to temperature and pressure effects. FIG. 4 shows the spiral effect which is the spiral bending deformation of tubing 510-1 within casing 510-2 as a result of the pressure acting on the ends of the tubing 510-1 coupled to casing 510-2 by packers 531 and 533.

FIG. 5 shows expansion and temperature effects that are caused by the pressure differential between inside of tubing 610-1 and the temperature change. Tubing 610-1 is within casing 610-2 and coupled to casing 610-2 by packers 631 and 633.

FIG. 6 shows the expansion and temperature effects that are caused by the pressure differential between outside of tubing 610-1 and the temperature change, respectively. The parameters $p_i$ and $p_o$ are internal and external pressures, respectively. Tubing 710-1 is within casing 710-2 and coupled to casing 710-2 by packers 731 and 733.

Consider casing deformations due to formation compaction effects. Formation compaction has significant physical and economic impacts on the drilling, production and asset management of hydrocarbon reservoirs. Effects of formation compaction on the cased boreholes can appear in the form of buckling, deformation, or tearing apart for the casing strings. In multi-casing conditions, this effect is most likely observed for the outer-most pipes that are in physical contact with the formation. FIGS. 7-12 show examples of various effects that can occur on the casing for deformation of the casing due to the formation compaction effects. These effects are more likely to deform the outer most casing which is in physical contact with the formation. Each of the FIGS. 7-12 shows a multi-pipe structure that includes a tubing and casings 1, 2 to M. The number of casings can be 1 or 2 in various applications.

Effects due to the buckling of the tubing/casings such as pipe's folding, tears, or any other types of deformation or change in the thickness can be detected using suitable inversion algorithms. The thickness and outer diameter (OD) variations can be determined by an optimization algorithm. The folding of the tubing/casings has similar effect as metal gain at that section of the pipe or increase in the number of the pipes in extreme cases. This can be detected using lower frequencies when using frequency-domain EC measurements or can be detected at later times when using time-domain EC measurements. Also, tears in the tubing/casings can be detected as the local decrease in the number of pipes. These effects will be mostly observed as local drastic changes in the responses along the axial direction. The responses along the axial direction can be taken as the log of the measurements. In the following, proper inversion algorithms are described that take into account the buckling effects in the tubing/casings.

The fastest and most practical inversion approach is based on the one-dimensional (1D) forward modeling, since it requires less memory and time to perform the simulation. In the conventional 1D modeling only the number. ODs, and thicknesses of the pipes are allowed to be optimized, while the length of the pipes is assumed to be infinite. For this purpose, the 1D forward modeling and optimization algorithm is employed at each position along the axial direction to obtain the number, ODs, and thicknesses of the pipes at that particular position. By stitching together these inversion results at all axial positions, the profiles of the pipes along the depth are roughly evaluated. This provides a clue if there are significant deformations due to the tubing/casings buckling.

Figure 13:
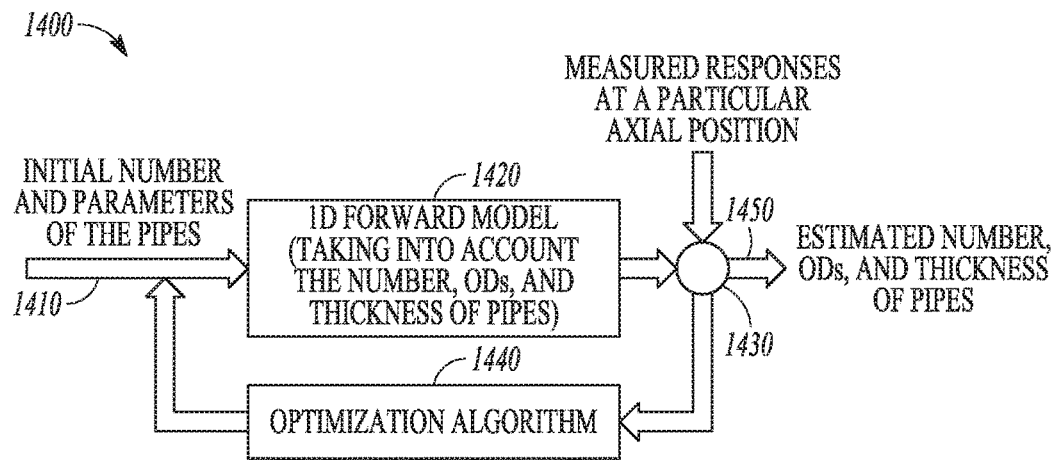
FIG. 13 is a flow diagram of an example method providing an inversion algorithm using a one-dimensional forward model to estimate parameters of a multi-pipe structure, in accordance with various embodiments.

FIG. 13 is a flow diagram of an embodiment of an example method 1400 providing an inversion algorithm using a 1D forward model to estimate parameters of a multi-pipe structure. The estimated parameter can include the number of pipes, ODs, and thicknesses of the pipes at each axial position. At 1410, an initial number and parameters of the pipes of the multi-pipe structure is input to a 1D forward model. At 1420, the 1D forward model operates on the input to the 1D forward model taking into account the number of pipes, the ODs of the pipes and the thicknesses of the pipes. At 1430, a comparison is made between the output of the 1D forward model and measured responses at a particular axial position. If the comparison does not meet a convergence condition, the comparison, the output of the 1D forward model, and/or the measured responses can be input to an optimization algorithm. At 1440, the optimization algorithm operates on the input to the optimization algorithm. The result of the optimization is input to the 1D forward model for further processing, where the results of such processing is compared to the measured responses at the particular axial position. If the comparison does not meet the convergence condition, the comparison, the output of the 1D forward model, and/or the measured responses can again be input to the optimization algorithm, and the procedure can continue. If the comparison meets the convergence condition, at 1450, the results of the comparison can include generation of the estimated number, ODs, and thicknesses of the pipes at the particular axial position.

The work flow of FIG. 13 can be performed at each axial position of a number of axial positions along the length of the pipes. The resulting estimated number, ODs, and thicknesses of the pipes at the number of axial positions can be stitched together. The stitched together results can be evaluated and imaged on a display structure.

In various embodiments, two-dimensional (2D) modeling of a multi-pipe structure can be performed to obtain the number, ODs, and thickness of pipes, and their eccentricity with respect to the tool used in measurement of the multi-pipe structure at each axial position. This modeling assumes infinite stretch of the pipes with the same thickness, number of pipes, and eccentricity along the axial direction. Thus, using such models for finite sections of the pipes provides approximate solutions to determine the 3D profile of the pipes by stitching together all the 2D approximations of the cross-sections of the pipes at various axial positions.

Figure 14:
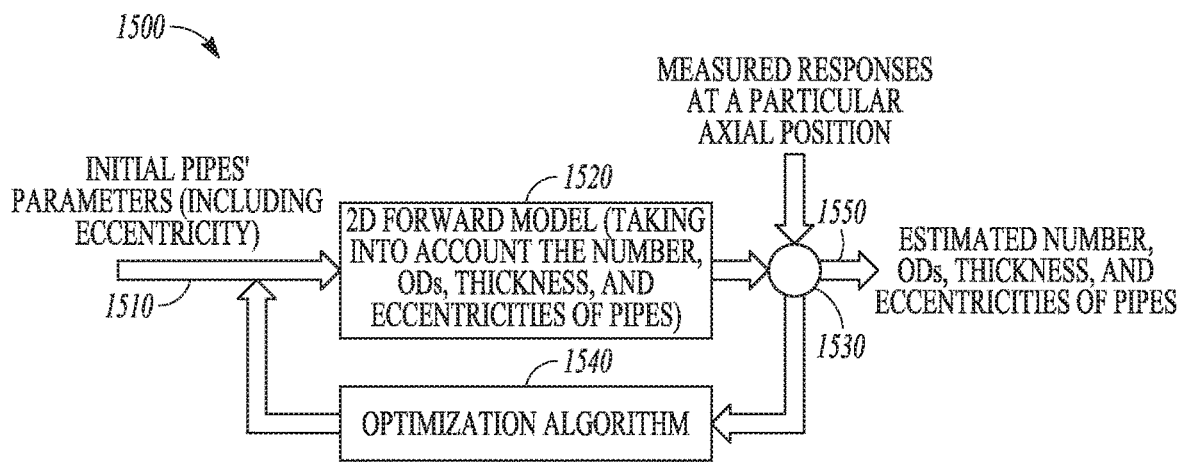
FIG. 14 is a flow diagram of an example method providing an inversion algorithm using a two-dimensional forward model to estimate parameters of a multi-pipe structure, in accordance with various embodiments.

FIG. 14 is a flow diagram of an embodiment of an example method 1500 providing an inversion algorithm using a 2D forward model to estimate parameters of a multi-pipe structure. The estimated parameter can include the number of pipes, ODs, and thicknesses of the pipes at each axial position. At 1510, initial parameters of the pipes of the multi-pipe structure including eccentricity are input to a 2D forward model. At 1520, the 2D forward model operates on the input to the 2D forward model taking into account the number of pipes, the ODs of the pipes, the thickness, and the eccentricities of the pipes. At 1530, a comparison is made between the output of the 2D forward model and measured responses at a particular axial position. If the comparison does not meet a convergence condition, the comparison, the output of the 1D forward model, and/or the measured responses can be input to an optimization algorithm. At 1540, the optimization algorithm operates on the input to the optimization algorithm. The result of the optimization is input to the 2D forward model for further processing, where the results of such processing is compared to the measured responses at the particular axial position. If the comparison does not meet the convergence condition, the comparison, the output of the 2D forward model, and/or the measured responses can again be input to the optimization algorithm, and the procedure can continue. If the comparison meets the convergence condition, at 1550, the results of the comparison can include generation of the estimated number, ODs, thicknesses, and eccentricities of the pipes at the particular axial position.

The work flow of FIG. 14 can be performed at each axial position of a number of axial positions along the length of the pipes. The resulting estimated number, ODs, thicknesses, and eccentricities of the pipes at the number of axial positions can be stitched together. The stitched together results can be evaluated and imaged on a display structure.

In various embodiments, three-dimensional (3D) modeling algorithms can be employed where all the details of the measurement setup can be modeled. This model can be employed in an optimization algorithm to estimate the unknown parameters of the problem including the pipe shapes and parameters. In this case, the output of the inversion algorithm can be the exact shape and thickness of the pipes. The 3D inversion—approach will likely be more accurate than the 1D or 2D approaches, but can be expensive in terms of the required memory and time to obtain a solution, and therefore may not be optimal in every case.

Figure 15:
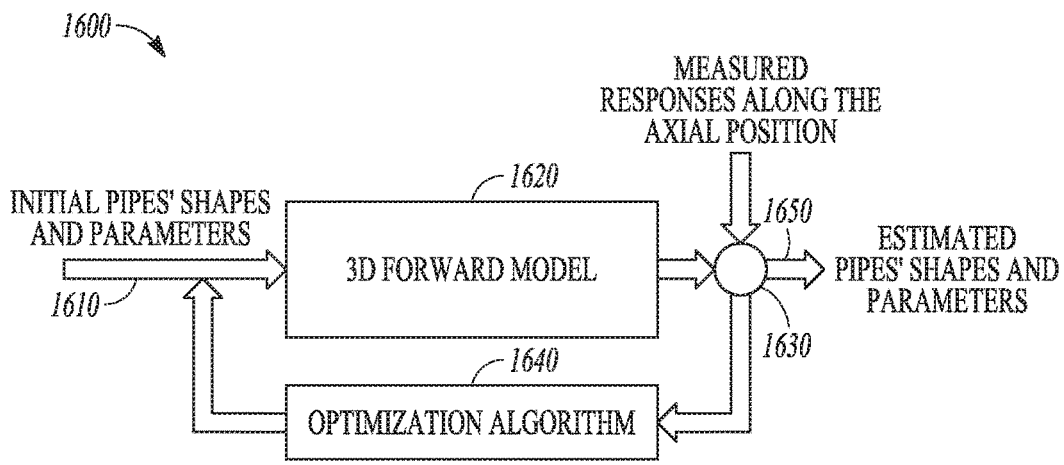
FIG. 15 is a flow diagram of an example method providing an inversion algorithm using three-dimensional forward model to estimate parameters of a multi-pipe structure, in accordance with various embodiments.

FIG. 15 is a flow diagram of an embodiment of an example method 1600 providing an inversion algorithm using 3D forward model to estimate shapes and parameters of a multi-pipe structure. At 1610, an initial parameters and shapes of the pipes of the multi-pipe structure is input to a 3D forward model. At 1620, the 3D forward model operates on the input to the 3D forward model. At 1630, a comparison is made between the output of the 3D forward model and measured responses along the axial direction. If the comparison does not meet a convergence condition, the comparison, the output of the 3D forward model, and/or the measured responses can be input to an optimization algorithm. At 1640, the optimization algorithm operates on the input to the optimization algorithm. The result of the optimization is input to the 3D forward model for further processing, where the results of such processing is compared to the measured responses along the axial direction. If the comparison does not meet the convergence condition, the comparison, the output of the 3D forward model, and/or the measured responses can again be input to the optimization algorithm, and the procedure can continue. If the comparison meets the convergence condition, at 1650, the results of the comparison can include generation of the estimated pipes' shapes and parameters. The results can be evaluated and imaged on a display structure.

Figure 16:
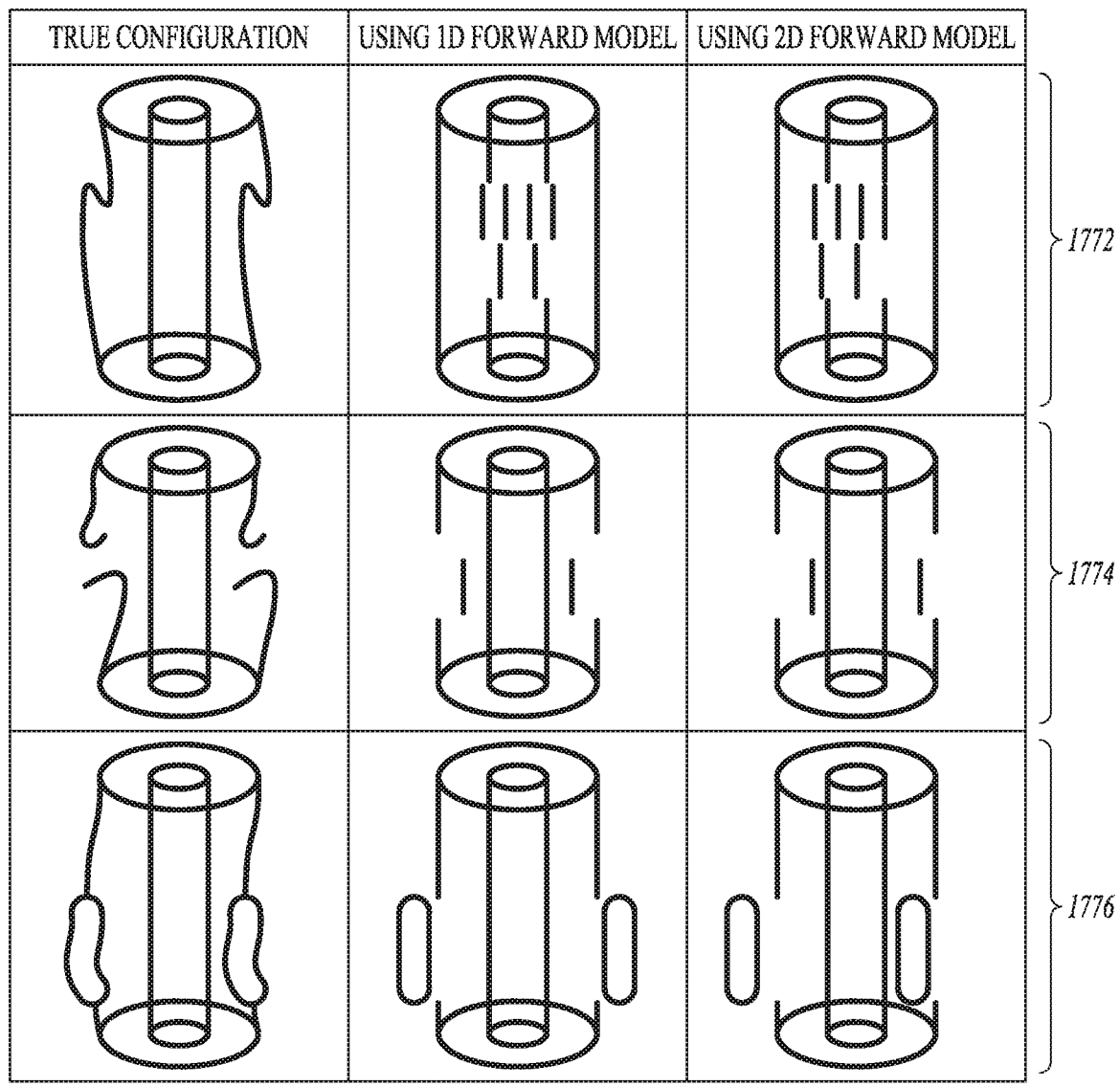
FIG. 16 is an illustration of the manner in which results of one-dimensional and two-dimensional inversion algorithms may look like for some typical buckling problems, in accordance with various embodiments.

Inversion by 3D inversion is typically the best but most expensive approach in terms of required memory and time for the solution. However, the 1D and 2D approaches can provide approximate solutions. For 1D and 2D inversions, the response at each depth can be used and operate to solve the inverse problem assuming that the pipes configuration at that depth is infinite along the axial direction. Once, the solutions are found at all depths, they are stitched together to provide an approximate solution along the axial direction. Any local abnormality along the depth can then be detected. FIG. 16 is an illustration of the manner in which results of the 1D and 2D inversion algorithms may look like for some typical buckling problems 1772, 1774, and 1776.

Figure 19:
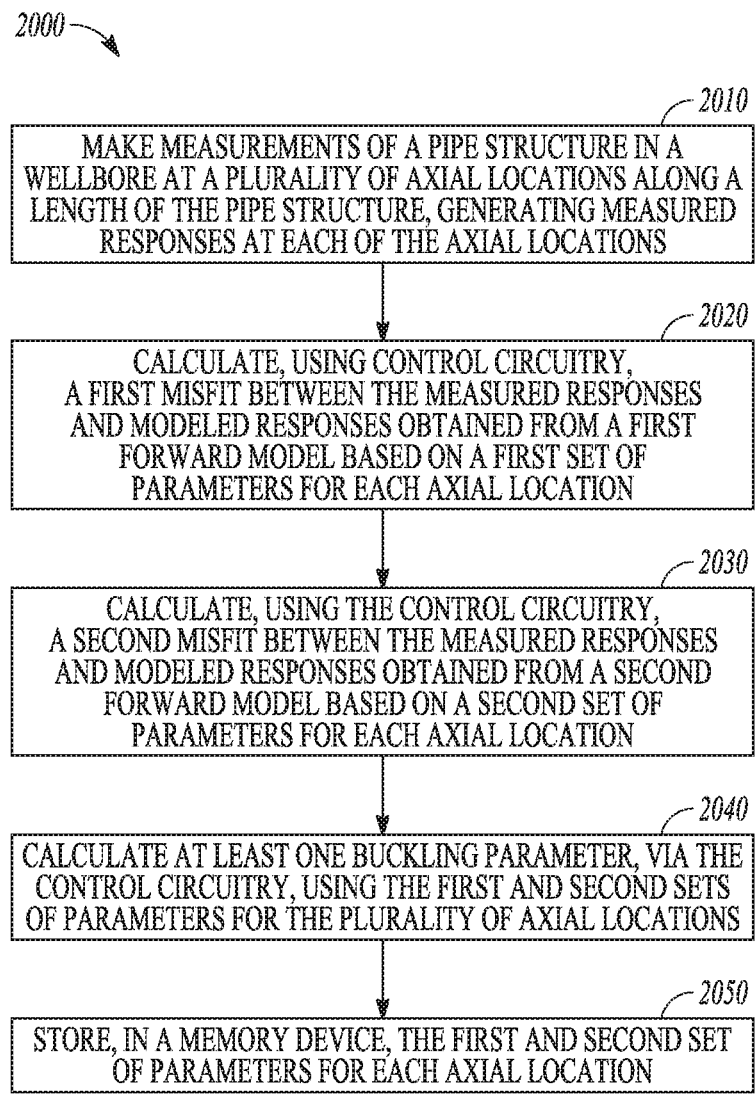
FIG. 19 is a flow diagram of an example method of evaluating pipes with respect to buckling effects, in accordance with various embodiments.

It is useful to have a quantitative assessment of the formation compaction effect. In various embodiments, a procedure can be implemented to evaluate this effect quantitatively at each depth and also a quantity that represents the total formation compaction effect in percentages. In order to do that, the thickness increase for the pipes due to the formation compaction can be used. It is usually the case that formation compaction puts pressure on the pipes, making the pipes shorter but the amount of metal for the pipes remains the same. Thus, this leads to an increase in the thickness of the pipes along the affected region. FIGS. 18 and 19 are illustrations of the formation compaction effect on the thickness of the affected pipe.

FIG. 17 is a representation of pipes before formation compaction. Shown in FIG. 17 is a length L of a pipe structure 1805 in formation 1802, where the pipe structure 1805 has an inner pipe 1810-1 and an outer pipe 1810-2. The outer pipe 1810-2 has thickness $T_1$ at a radius $r_1$ from the center of the pipe structure 1805. FIG. 18 is a representation of pipes after formation compaction, where the length of the section of pipe structure 1805 shown in FIG. 17 is changed to L-ΔL with the outer pipe 1810-2 having thickness $T_2$ at a radius $r_2$ from the center of the pipe structure 1805 after compaction.

This formation compaction effect can be quantified at each depth in the affected region by comparing the volume of metal along a tiny differential length before and after the formation compaction effect. The volume of metal V at depth z and for a tiny differential length along the z axis, Δz, where the thickness of the pipe is T and the average radius of pipe is r (average of the inner diameter and outer diameter of the pipe) is:

$$V(z)=2\pi r(z)T(z)\Delta z \quad (1)$$

If the volume of metal at depth z and for a tiny differential length along the z axis, before and after the formation compaction is denoted by $V_1(z)$ and $V_2(z)$, respectively, then formation compaction percentage (FCP) at each z position can be derived as:

$$FCP(z) = \frac{V_2(z) - V_1(z)}{V_1(z)} \times 100 \quad (2)$$

If the average radius and the thickness of the pipe are, $r_1$ and $T_1$ before formation compaction and $r_2$ and $T_2$ after the formation compaction, respectively, the FCP at each depth z can be written as $$FCP(z) = \frac{r_2(z)T_2(z) - r_1(z)T_1(z)}{r_1(z)T_1(z)} \times 100 \quad (3)$$

The values of parameters $r_1$, $T_1$, $r_2$, and $T_2$ are obtained from solving the inversion problems as described earlier.

Another parameter can be introduced to quantify the total effect of the formation compaction. It can be referred to as a total formation compaction percentage (TFCP). This parameter can be computed by taking the integral of FCP over the whole affected region, which is shown as L-ΔL in FIG. 19, as:

$$TFCP = \frac{1}{L - \Delta L} \int_{L - \Delta L} FCP(z)dz, \quad (4)$$

where ΔL can be obtained from the inversion results. The two parameters FCP(z) and TFCP provide proper means to compare the formation compaction severity for one pipe over time or to compare that for various pipes in the same or different formations. The severity of the formation compaction effect over time can be determined by time-laps logging of the same pipe.

If the formation compaction is affecting more than one pipe such as in multiple casing conditions, the average of FCP(z) and TFCP can be computed for all the affected pipes with proper weighting coefficients. For example, if M pipes are affected, assuming that FCPm(z) and TFCPm denote the FCP and TFCP parameters for the m-th pipe, m=1 ... M, the following two parameters can represent the overall formation compaction severity for the multiple pipes:

$$FCP(z) = \frac{\sum_{m=1}^{M} w_m FCPm(z)}{M} \quad (5)$$

$$TFCP = \frac{\sum_{m=1}^{M} w'_m TFCPm}{M} \quad (6)$$

where $w_m$ and $w'_m$ are proper weighting coefficients.

FIG. 19 is a flow diagram of an embodiment of an example method 2000 of evaluating pipes with respect to buckling effects. At 2010, measurements are made of a pipe structure in a wellbore at a plurality of axial locations along a length of the pipe structure, generating measured responses at each of the axial locations. The pipe structure can have a number of pipes.

Operations can be conducted, via control circuitry, for each axial location of the plurality of axial locations. At 2020, using the control circuitry, a first misfit between the measured responses and modeled responses obtained from a first forward model based on a first set of parameters is calculated. At 2030, using the control circuitry, a second misfit between the measured responses and modeled responses obtained from a second forward model based on a second set of parameters is calculated. In various embodiments, the first and second forward models may both be one dimensional. In various embodiments, one of the first and second forward models may be one dimensional and the other may be two or three dimensional.

At 2040, at least one buckling parameter is calculated, via the control circuitry, using the first and second sets of parameters for the plurality of axial locations. Calculating at least one buckling parameter can comprise determining one or more of: presence of buckling, amount of buckling, or type of buckling from the first and second sets of parameters. At 2050, the first and second sets of parameters for each axial location are stored in a memory device. The memory device for storing the first and second set of parameters and the control circuitry may be located at the surface or downhole in proximity to the transmitter and receivers used to make the measurements of the pipe structure in the wellbore. The first and second set of parameters and/or raw measurements can be transmitted directly to the surface and processed, stored in memory downhole, or a combination of transmitting portions of the first and second set of parameters and/or raw measurements and storing in memory downhole. In some instances, data in a downhole memory device may be retrieved by conveying the memory device to the surface.

Method 2000 or methods similar to method 2000 can include a number of features or combination of features. Method 2000 or methods similar to method 2000 can include calculating a third set of parameters that is constructed by stitching together the first and second sets of parameters to form a single result. The stitching can include selecting among first and second sets of parameters, the one that produces the smallest misfit among first and second misfits. The third set of parameters can include a number of pipes, and calculating at least one buckling parameter includes determining a transition between a value of the number of pipes and another value of the number of pipes. The third set of parameters can include an eccentricity value, and calculating at least one buckling parameter can include determining a transition between a value of eccentricity and another value of eccentricity. Determining the transition between the value of eccentricity and another value of eccentricity can include comparing the difference between the first value of eccentricity and second value of eccentricity to an eccentricity threshold. The third set of parameters can be displayed on a display. The third set of parameters can include a thickness characteristic and can include displaying the pipe structure using the thickness characteristic to represent one or more buckling effects or a formation compaction effect.

Method 2000 or methods similar to method 2000 can include presence of buckling being determined as a discrepancy between a number of pipes in the well structure in a well plan and a value for a number of pipes in the first or second set of parameters. With respect to the third set constructed from a stitching operation, presence of buckling can be determined as a discrepancy between a number of pipes in the well structure in a well plan and a value for a number of pipes in the first or second set of parameters. The first and second sets of parameters can include one or more of a value of determined number of pipes of the pipe structure, outside diameters of the determined pipes of the pipe structure, or thicknesses of the determined pipes of the pipe structure.

Calculating at least one buckling parameter can include determination of deformation, folding, tearing apart, or thickness change at each axial location of one or more pipes of the pipe structure. Determining folding or tearing apart of a pipe includes determining the folding or the tearing apart from an abrupt change in a value of the number of the pipes at a corresponding axial location.

Method 2000 or methods similar to method 2000 can include using the first and second sets of parameters at each axial location that satisfy a convergence condition to generate a formation compaction percentage at each axial location. Such operation can be conducted with respect to the third set of parameters that is constructed by stitching together the first and second sets of parameters to form a single result. Such methods can include generating a total formation compaction percentage using the formation compaction percentage at axial locations over a region along the length of a pipe structure. Such methods can include generating an average formation compaction percentage and an average total formation compaction percentage when the pipe structure is a multi-pipe structure.

Method 2000 or methods similar to method 2000 or methods derived from such methods can include other appropriate techniques and procedures as taught herein.

In various embodiments, a machine-readable storage device can comprise instructions stored thereon, which, when performed by a machine, cause the machine to perform operations, the operations comprising one or more features similar to or identical to features of methods and techniques described with respect to methods 1400, 1500, 1600, and 2000, variations thereof, and/or features of other methods taught herein. The physical structures of such instructions may be operated on by one or more processors.

Executing these physical structures can cause the machine to perform operations comprising: making measurements of a pipe structure in a wellbore at a plurality of axial locations along a length of the pipe structure, generating measured responses at each of the axial locations, the pipe structure having a number of pipes: conducting, via control circuitry, operations for each axial location of the plurality of axial locations, the operations including: calculating a first misfit between the measured responses and modeled responses obtained from a first forward model based on a first set of parameters; and calculating a second misfit between the measured responses and modeled responses obtained from a second forward model based on a second set of parameters; and calculating at least one buckling parameter, via the control circuitry, using the first and second sets of parameters for the plurality of axial locations; and storing, in a memory device, the first and second set of parameters from the operations for each axial location. In various embodiments, the first and second forward models may both be one dimensional. In various embodiments, one of the first and second forward models may be one dimensional and the other may be two or three dimensional. The instructions can include instructions to operate a tool or tools having sensors disposed in a multi-pipe structure downhole in a borehole to provide data to process in accordance with the teachings herein. The multi-pipe structure may be realized as a multi-casing structure disposed in a borehole at a well site.

Operations executed based on instructions in machine-readable storage devices can include a number of features or combination of features. Such machine-readable storage devices can include instructions to perform operations that include calculating at least one buckling parameter to comprise determining one or more of presence of buckling, amount of buckling, or type of buckling from the first and second sets of parameters. Operations can include calculating a third set of parameters that is constructed by stitching together the first and second sets of parameters to form a single result. The stitching can include selecting among first and second sets of parameters, the one that produces the smallest misfit among first and second misfits. The third set of parameters can include a number of pipes, and calculating at least one buckling parameter can include determining a transition between a value of the number of pipes and another value of the number of pipes. The third set of parameters can include an eccentricity value, and calculating at least one buckling parameter can include determining a transition between a value of eccentricity and another value of eccentricity. Determining the transition between the value of eccentricity and another value of eccentricity can include comparing the difference between the first value of eccentricity and second value of eccentricity to an eccentricity threshold. Operations can include displaying on a display the third set of parameters. The third set of parameters can include a thickness characteristic and can include displaying the pipe structure using the thickness characteristic to represent one or more buckling effects or a formation compaction effect.

Operations executed based on instructions in machine-readable storage devices can include presence of buckling being determined as a discrepancy between a number of pipes in the well structure in a well plan and a value for a number of pipes in the first or second set of parameters. With respect to the third set constructed from a stitching operation, presence of buckling can be determined as a discrepancy between a number of pipes in the well structure in a well plan and a value for a number of pipes in the first or second set of parameters. The first and second sets of parameters can include one or more of a value of determined number of pipes of the pipe structure, outside diameters of the determined pipes of the pipe structure, or thicknesses of the determined pipes of the pipe structure. Calculating at least one buckling parameter can include determination of deformation, folding, tearing apart, or thickness change at each axial location of one or more pipes of the pipe structure. Determining folding or tearing apart of a pipe can include determining the folding or the tearing apart from an abrupt change in a value of the number of the pipes at a corresponding axial location.

Operations executed based on instructions in machine-readable storage devices can include using the first and second sets of parameters at each axial location that satisfy a convergence condition to generate a formation compaction percentage at each axial location. Operations can include generating a total formation compaction percentage using the formation compaction percentage at axial locations over a region along the length of a pipe structure. Operations can include generating an average formation compaction percentage and an average total formation compaction percentage when the pipe structure is a multi-pipe structure.

Further, a machine-readable storage device, herein, is a physical device that stores data represented by physical structure within the device. Such a physical device is a non-transitory device. Examples of machine-readable storage devices can include, but are not limited to, read only memory (ROM), random access memory (RAM), a magnetic disk storage device, an optical storage device, a flash memory, and other electronic, magnetic, and/or optical memory devices. The machine-readable device may be a machine-readable medium such as memory module 2135 of FIG. 20. While memory module 2135 is shown as a single unit, terms such as "memory module," "machine-readable medium," "machine-readable device," and similar terms should be taken to include all forms of storage media, either in the form of a single medium (or device) or multiple media (or devices), in all forms. For example, such structures can be realized as centralized database(s), distributed database(s), associated caches, and servers; one or more storage devices, such as storage drives (including but not limited to electronic, magnetic, and optical drives and storage mechanisms), and one or more instances of memory devices or modules (whether main memory: cache storage, either internal or external to a processor; or buffers). Terms such as "memory module," "machine-readable medium," "machine-readable device," shall be taken to include any tangible non-transitory medium which is capable of storing or encoding a sequence of instructions for execution by the machine and that cause the machine to perform any one of the methodologies taught herein. The term "non-transitory" used in reference to a "machine-readable device," "medium," "storage medium." "device," or "storage device" expressly includes all forms of storage drives (optical, magnetic, electrical, etc.) and all forms of memory devices (e.g., DRAM, Flash (of all storage designs), SRAM, MRAM, phase change, etc., as well as all other structures designed to store data of any type for later retrieval.

Figure 20:
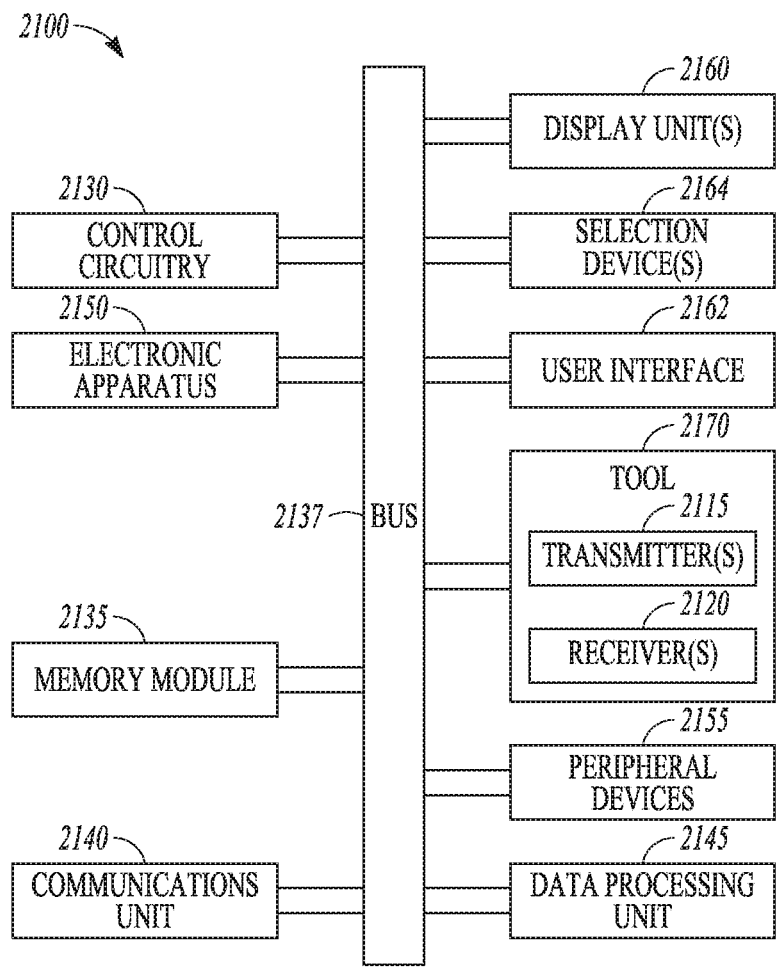
FIG. 20 is a block diagram of features of an example system operable to execute schemes associated with evaluation of pipes with respect to buckling effects, in accordance with various embodiments.

FIG. 20 is a block diagram of features of an embodiment of an example system 2100 operable to execute schemes associated with evaluation of pipes with respect to buckling effects. The system 2100 can be implemented at a well site to, among other things, to evaluate a pipe or pipes disposed in a borehole. In various embodiments, the pipes may be disposed having an arrangement as a multi-pipe structure. The multi-pipe structure may be a production structure of the well site.

The system 2100 can comprise a tool 2170 having a set of transmitters 2115 to transmit one or more electromagnetic signals in a pipe structure at a plurality of axial locations, where the pipe structure has a number of pipes around a reference axis such that the tool is arrangeable within the pipe. The tool 2170 can include a set of receivers 2120 to receive responses in response to exciting the pipe structure with the one or more electromagnetic signals. The transmitters 2115 can be arrangeable in a pipe structure to transmit a plurality of electromagnetic signals in the pipe structure and the set of receivers 2120 can be arrangeable in the pipe structure to receive signals in response to exciting a pipe or pipes in the pipe structure. The set of transmitters 2115 may be realized by one or more transmitters and can include transmitters with variable dimensions or tapped transmitter coils to excite selected ones of the pipes of a pipe structure.

The set of transmitters 2115 and receivers 2120 can be structured as taught herein, for example similar or identical to transmitters and receivers associated with FIGS. 1-3.

The system 2100 can include control circuitry 2130. The control circuitry 2130 can be arranged to control variable current levels to the set of transmitters to excite the selected ones of the pipes. System 2100 can be implemented to operate in a manner as taught herein to evaluate the pipe structure such as but not limited to the teachings associated with FIGS. 1-20.

The control circuitry 2130 can be realized as one or more processors. The control circuitry 2130 can be realized as a single processor or a group of processors. Processors of the group of processors may operate independently depending on an assigned function. The control circuitry 2130 can be realized as one more application-specific integrated circuits (ASICs). The control circuitry 2130 can be arranged to determine buckling of one or more pipes of a pipe structure based on the received responses at the receivers 2120. The control circuitry 2130 can be arranged to conduct operations for each axial location of the plurality of axial locations in which the tool 2170 is moved or located to make measurements.

The control circuitry 2130 can be structured to conduct operations, where the operations include calculation of a first misfit between the measured responses and modeled responses obtained from a first forward model based on a first set of parameters; calculation of a second misfit between the measured responses and modeled responses obtained from a second forward model based on a second set of parameters; and calculation of at least one buckling parameter using the first and second sets of parameters for the plurality of axial locations. In various embodiments, the first and second forward models may both be one dimensional. In various embodiments, one of the first and second forward models may be one dimensional and the other may be two or three dimensional. The calculation of the at least one buckling parameter can comprise determination of one or more of presence of buckling, amount of buckling, or type of buckling from the first and second sets of parameters. The control circuitry 1230 can be operatively coupled to a memory module 2135 of the system 2100 in which the memory module 2135 provides a memory device to operatively store the first and second set of parameters from the operations for each axial location.

The control circuitry 2130 can be structured to conduct operations according to features or combination of features associate with any of the methods taught herein or associated with FIGS. 13-15 and 19. The control circuitry 2130 can be arranged to arrange to calculate a third set of parameters, which can be constructed by stitching together the first and second sets of parameters to form a single result. The stitching can include selection, among first and second sets of parameters, of one that produces the smallest misfit among first and second misfits. The third set of parameters can include a number of pipes, and calculation of the at least one buckling parameter includes determination of a transition between a value of the number of pipes and another value of the number of pipes. The third set of parameters includes an eccentricity value, and calculation of the at least one buckling parameter includes determination of a transition between a value of eccentricity and another value of eccentricity. Determination of the transition between the value of eccentricity and another value of eccentricity can include a comparison of a difference between the first value of eccentricity and second value of eccentricity to an eccentricity threshold. The third set of parameters can be displayed on a display of the system 2100. The third set of parameters includes a thickness characteristic and the control circuitry is arranged to display the pipe structure using the thickness characteristic to represent one or more buckling effects or a formation compaction effect.

The control circuitry 2130 can be arranged to determine presence of buckling as a discrepancy between a number of pipes in the well structure in a well plan and a value for a number of pipes in the first or second set of parameters. With respect to the third set of parameters constructed by stitching together the first and second sets of parameters to form a single result, the control circuitry can be arranged to determine presence of buckling as a discrepancy between a number of pipes in the well structure in a well plan and a value for a number of pipes in the first or second set of parameters. The first and second sets of parameters can include one or more of a value of determined number of pipes of the pipe structure, outside diameters of the determined pipes of the pipe structure, or thicknesses of the determined pipes of the pipe structure. Calculation of at least one buckling parameter can include determination of deformation, folding, tearing apart, or thickness change at each axial location of one or more pipes of the pipe structure. Determination of folding or tearing apart of a pipe can include determination of the folding or the tearing apart from an abrupt change in a value of the number of the pipes at a corresponding axial location.

The control circuitry can be arranged to use the first and second sets of parameters at each axial location that satisfy a convergence condition to generate a formation compaction percentage at each axial location.

In controlling operation of the components of system 2100 to execute schemes associated with detection and evaluation of buckling effects in pipes, the control circuitry 2130 can direct access of data to and from a database. The database can include parameters and/or expected parameters for the pipes being investigated such as, but not limited to, radius (r), thickness (T), magnetic permeability ($\mu$), and electrical conductivity ($\sigma$).

The system 2100 can include a user interface 2162 operable with the control circuitry 2130, a data processing unit 2145 operable with the user interface 2162, where the control circuitry 2130, the user interface 2162, and the data processing unit 2145 are structured to be operated according to any scheme similar to or identical to the schemes associated with detecting and evaluating buckling effects in a pipe or multiple pipes as taught herein. The system 2100 can be arranged to perform various operations on the data, acquired from the tool 2170 operational in a pipe structure disposed downhole at a wellsite, in a manner similar or identical to any of the processing techniques discussed herein.

The system 2100 can be arranged as a distributed system. Data from operating the tool 2170 at various depths in a pipe or multi-pipe structure can be processed by the one or more processors 2130. Arrangement of the control circuitry 2150 to conduct operations associated with inspection of a pipe or pipes with respect to buckling effects can include operative coupling with the memory module 2135 containing instructions executable by the control circuitry 2130. Alternatively, evaluation may be conducted by the data processing unit 2145 as a dedicated evaluation module.

The system 2100 can include an electronic apparatus 2150 and a communications unit 2140. The control circuitry 2130, the memory module 2135, and the communications unit 2140 can be arranged to operate as a processing unit to control management of tool 2170 and to perform operations on data signals collected by the tool 2170. The memory module 2135 can include a database having information and other data such that the system 2100 can operate on data from the tool 2170. In an embodiment, the data processing unit 2145 can be distributed among the components of the system 2100 including memory module 2135 and/or the electronic apparatus 2150.

The communications unit 2140 can include downhole communications for communication to the surface at a well site from the tool 2170 in a pipe structure. The communications unit 2140 may use combinations of wired communication technologies and wireless technologies at frequencies that do not interfere with on-going measurements. The communications unit 2140 can allow for a portion or all of the data analysis to be conducted within a pipe structure with results provided to the user interface 2162 for presentation on the one or more display unit(s) 2160 aboveground. The communications unit 2140 can provide for data to be sent aboveground such that substantially all analysis is performed aboveground. The data collected by the tool 2170 can be stored with the tool 2170 that can be brought to the surface to provide the data to the one or more processors 2130, the user interface 2162, and/or the data processing unit 2145. The communications unit 2140 can allow for transmission of commands to tool 2170 in response to signals provided by a user through the user interface 2162.

The system 2100 can also include a bus 2137, where the bus 2137 provides electrical conductivity among the components of the system 2100. The bus 2137 can include an address bus, a data bus, and a control bus, each independently configured. The bus 2137 can be realized using a number of different communication mediums that allows for the distribution of components of the system 2100. Use of the bus 2137 can be regulated by the control circuitry 2130. The bus 2137 can include a communications network to transmit and receive signals including data signals and command and control signals.

In various embodiments, the peripheral devices 2155 can include drivers to provide voltage and/or current input to the set of transmitters 2115, additional storage memory and/or other control devices that may operate in conjunction with the processor(s) 2130 and/or the memory module 2135. The display unit(s) 2160 can be arranged with a screen display, as a distributed component on the surface, that can be used with instructions stored in the memory module 2135 to implement the user interface 2162 to manage the operation of the tool 2170 and/or components distributed within the system 2100. Such a user interface can be operated in conjunction with the communications unit 2140 and the bus 2137. The display unit(s) 2160 can include a video screen, a printing device, or other structure to visually project data/information and images. The system 2100 can include a number of selection devices 2164 operable with the user interface 2162 to provide user inputs to operate the data processing unit 2145 or its equivalent. The selection device(s) 2164 can include one or more of a touch screen or a computer mouse operable with the user interface 2162 to provide user inputs to operate the data processing unit 2145 or other components of the system 2100.

The following are example embodiments of methods and systems in accordance with the teachings herein.

A method 1 can comprise: making measurements of a pipe structure in a wellbore at a plurality of axial locations along a length of the pipe structure, generating measured responses at each of the axial locations, the pipe structure having a number of pipes: conducting, via control circuitry, operations for each axial location of the plurality of axial locations, the operations including: calculating a first misfit between the measured responses and modeled responses obtained from a first forward model based on a first set of parameters; calculating a second misfit between the measured responses and modeled responses obtained from a second forward model based on a second set of parameters: and calculating at least one buckling parameter, via the control circuitry, using the first and second sets of parameters for the plurality of axial locations; and storing, in a memory device, the first and second set of parameters from the operations for each axial location.

A method 2 can include elements of method 1 and can include calculating at least one buckling parameter to comprise determining one or more of presence of buckling, amount of buckling, or type of buckling from the first and second sets of parameters.

A method 3 can include elements of any of methods 1-2 and can include calculating a third set of parameters that is constructed by stitching together the first and second sets of parameters to form a single result.

A method 4 can include elements of method 3 and elements of any of methods 1-2 and can include the stitching to include selecting among first and second sets of parameters, the one that produces the smallest misfit among first and second misfits.

A method 5 can include elements of method 3 and elements of any of methods 1-2 and 4 and can include the third set of parameters to include a number of pipes, and calculating at least one buckling parameter to include determining a transition between a value of the number of pipes and another value of the number of pipes.

A method 6 can include elements of method 3 and elements of any of methods 1-2 and 4-5 and can include the third set of parameters to include an eccentricity value, and calculating at least one buckling parameter to include determining a transition between a value of eccentricity and another value of eccentricity.

A method 7 can include elements of method 6 and elements of any of methods 1-5 and can include determining the transition between the value of eccentricity and another value of eccentricity to include comparing the difference between the first value of eccentricity and second value of eccentricity to an eccentricity threshold.

A method 8 can include elements of method 3 and elements of any of methods 1-2 and 4-7 and can include displaying on a display the third set of parameters.

A method 9 can include elements of method 3 and elements of any of methods 1-2 and 4-8 and can include the third set of parameters to include a thickness characteristic and can include displaying the pipe structure using the thickness characteristic to represent one or more buckling effects or a formation compaction effect.

A method 10 can include elements of any of methods 1-9 and can include presence of buckling being determined as a discrepancy between a number of pipes in the well structure in a well plan and a value for a number of pipes in the first or second set of parameters.

A method 11 can include elements of method 3 and elements of any of methods 1-2 and 4-9 and can include presence of buckling being determined as a discrepancy between a number of pipes in the well structure in a well plan and a value for a number of pipes in the first or second set of parameters.

A method 12 can include elements of any of methods 1-11 and can include the first and second sets of parameters to include one or more of a value of determined number of pipes of the pipe structure, outside diameters of the determined pipes of the pipe structure, or thicknesses of the determined pipes of the pipe structure.

A method 13 can include elements of any of methods 1-12 and can include calculating at least one buckling parameter to include determination of deformation, folding, tearing apart, or thickness change at each axial location of one or more pipes of the pipe structure.

A method 14 can include elements of method 13 and elements of any of methods 1-12 and can include determining folding or tearing apart of a pipe to include determining the folding or the tearing apart from an abrupt change in a value of the number of the pipes at a corresponding axial location.

A method 15 can include elements of methods 1 or 3 and elements any of methods 2 and 4-15 and can include using the first and second sets of parameters at each axial location that satisfy a convergence condition to generate a formation compaction percentage at each axial location.

A method 16 can include elements of method 15 and elements any of methods 1-14 and can include generating a total formation compaction percentage using the formation compaction percentage at axial locations over a region along the length of a pipe structure.

A method 17 can include elements of method 16 and elements any of methods 1-15 and can include generating an average formation compaction percentage and an average total formation compaction percentage when the pipe structure is a multi-pipe structure.

A method 18 can include elements of any of methods 1-17 and can include the first and second forward models both being one dimensional.

A method 19 can include elements of any of methods 1-17 and can include one of the first and second forward models being one dimensional and the other being two or three dimensional.

A machine-readable storage device 1 having instructions stored thereon, which, when executed by the control circuitry of a machine, cause the machine to perform operations, the operations can comprise: making measurements of a pipe structure in a wellbore at a plurality of axial locations along a length of the pipe structure, generating measured responses at each of the axial locations, the pipe structure having a number of pipes: conducting, via control circuitry, operations for each axial location of the plurality of axial locations, the operations including: calculating a first misfit between the measured responses and modeled responses obtained from a first forward model based on a first set of parameters: and calculating a second misfit between the measured responses and modeled responses obtained from a second forward model based on a second set of parameters; and calculating at least one buckling parameter, via the control circuitry, using the first and second sets of parameters for the plurality of axial locations; and storing, in a memory device, the first and second set of parameters from the operations for each axial location.

A machine-readable storage device 2 can include elements of machine-readable storage device 1 and can include calculating at least one buckling parameter to comprise determining one or more of presence of buckling, amount of buckling, or type of buckling from the first and second sets of parameters.

A machine-readable storage device 3 can include elements of any of machine-readable storage devices 1-2 and can include calculating a third set of parameters that is constructed by stitching together the first and second sets of parameters to form a single result.

A machine-readable storage device 4 can include elements of machine-readable storage device 3 and elements of any of machine-readable storage devices 1-2 and can include the stitching to include selecting among first and second sets of parameters, the one that produces the smallest misfit among first and second misfits.

A machine-readable storage device 5 can include elements of machine-readable storage device 3 and elements of any of machine-readable storage devices 1-2 and 4 and can include the third set of parameters to include a number of pipes, and calculating at least one buckling parameter to include determining a transition between a value of the number of pipes and another value of the number of pipes.

A machine-readable storage device 6 can include elements of machine-readable storage device 3 and elements of any of machine-readable storage devices 1-2 and 4-5 and can include the third set of parameters to include an eccentricity value, and calculating at least one buckling parameter to include determining a transition between a value of eccentricity and another value of eccentricity.

A machine-readable storage device 7 can include elements of machine-readable storage device 6 and elements of any of machine-readable storage devices 1-5 and can include determining the transition between the value of eccentricity and another value of eccentricity to include comparing the difference between the first value of eccentricity and second value of eccentricity to an eccentricity threshold.

A machine-readable storage device 8 can include elements of machine-readable storage device 3 and elements of any of machine-readable storage devices 1-2 and 4-7 and can include displaying on a display the third set of parameters.

A machine-readable storage device 9 can include elements of machine-readable storage device 3 and elements of any of machine-readable storage devices 1-2 and 4-8 and can include the third set of parameters to include a thickness characteristic and can include displaying the pipe structure using the thickness characteristic to represent one or more buckling effects or a formation compaction effect.

A machine-readable storage device 10 can include elements of any of machine-readable storage devices 1-9 and can include presence of buckling being determined as a discrepancy between a number of pipes in the well structure in a well plan and a value for a number of pipes in the first or second set of parameters.

A machine-readable storage device 11 can include elements of machine-readable storage device 3 and elements of any of machine-readable storage devices 1-2 and 4-9 and can include presence of buckling being determined as a discrepancy between a number of pipes in the well structure in a well plan and a value for a number of pipes in the first or second set of parameters.

A machine-readable storage device 12 can include elements of any of machine-readable storage devices 1-11 and can include the first and second sets of parameters to include one or more of a value of determined number of pipes of the pipe structure, outside diameters of the determined pipes of the pipe structure, or thicknesses of the determined pipes of the pipe structure.

A machine-readable storage device 13 can include elements of any of machine-readable storage devices 1-12 and can include calculating at least one buckling parameter to include determination of deformation, folding, tearing apart, or thickness change at each axial location of one or more pipes of the pipe structure.

A machine-readable storage device 14 can include elements of machine-readable storage device 13 and elements of any of machine-readable storage devices 1-12 and can include determining folding or tearing apart of a pipe to include determining the folding or the tearing apart from an abrupt change in a value of the number of the pipes at a corresponding axial location.

A machine-readable storage device 15 can include elements of machine-readable storage devices 1 or 3 and elements any of machine-readable storage devices 2 and 4-15 and can include using the first and second sets of parameters at each axial location that satisfy a convergence condition to generate a formation compaction percentage at each axial location.

A machine-readable storage device 16 can include elements of machine-readable storage device 15 and elements any of machine-readable storage devices 1-14 and can include generating a total formation compaction percentage using the formation compaction percentage at axial locations over a region along the length of a pipe structure.

A machine-readable storage device 17 can include elements of machine-readable storage device 16 and elements any of machine-readable storage devices 1-15 and can include generating an average formation compaction percentage and an average total formation compaction percentage when the pipe structure is a multi-pipe structure.

A machine-readable storage device 18 can include elements of any of machine-readable storage devices 1-17 and can include the first and second forward models both being one dimensional.

A machine-readable storage device 19 can include elements of any of machine-readable storage devices 1-17 and can include one of the first and second forward models being one dimensional and the other being two or three dimensional.

A system 1 can comprise: a tool having a set of transmitters to transmit one or more electromagnetic signals in a pipe structure at a plurality of axial locations, the pipe structure having a number of pipes around a reference axis such that the tool is arrangeable within the pipes: a set of receivers of the tool to receive responses in response to exciting the pipe structure with the one or more electromagnetic signals: control circuitry arranged to conduct operations for each axial location of the plurality of axial locations, the operations including: calculation of a first misfit between the measured responses and modeled responses obtained from a first forward model based on a first set of parameters; calculation of a second misfit between the measured responses and modeled responses obtained from a second forward model based on a second set of parameters; and calculation of at least one buckling parameter using the first and second sets of parameters for the plurality of axial locations; and a memory device to operatively store the first and second set of parameters from the operations for each axial location.

A system 2 can include elements of system 1 and can include the calculation of the at least one buckling parameter to comprise determination of one or more of presence of buckling, amount of buckling, or type of buckling from the first and second sets of parameters.

A system 3 can include elements of any of systems 1-2 and can include the control circuitry further arranged to include calculation of a third set of parameters, constructed by stitching together the first and second sets of parameters to form a single result.

A system 4 can include elements of system 3 and elements of any of systems 1-2 and can include the stitching to include selection, among first and second sets of parameters, of one that produces the smallest misfit among first and second misfits.

A system 5 can include elements of system 3 and elements of any of systems 1-2 and 4 and can include the third set of parameters to include a number of pipes, and calculation of the at least one buckling parameter to include determination of a transition between a value of the number of pipes and another value of the number of pipes.

A system 6 can include elements of system 3 and elements of any of systems 1-2 and 4-5 and can include the third set of parameters to include an eccentricity value, and calculation of the at least one buckling parameter to include determination of a transition between a value of eccentricity and another value of eccentricity.

A system 7 can include elements of system 6 and elements of any of systems 1-5 and can include determination of the transition between the value of eccentricity and another value of eccentricity to include a comparison of a difference between the first value of eccentricity and second value of eccentricity to an eccentricity threshold.

A system 8 can include elements of system 3 and elements of any of systems 1-2 and 4-7 and can include a display on which to display the third set of parameters.

A system 9 can include elements of system 3 and elements of any of systems 1-2 and 4-8 and can include the third set of parameters to include a thickness characteristic and the control circuitry being arranged to display the pipe structure using the thickness characteristic to represent one or more buckling effects or a formation compaction effect.

A system 10 can include elements of any of systems 1-9 and can include the control circuitry being arranged to determine presence of buckling as a discrepancy between a number of pipes in the well structure in a well plan and a value for a number of pipes in the first or second set of parameters.

A system 11 can include elements of system 3 and elements of any of systems 1-2 and 4-10 and can include the control circuitry being arranged to determine presence of buckling as a discrepancy between a number of pipes in the well structure in a well plan and a value for a number of pipes in the first or second set of parameters.

A system 12 can include elements of any of systems 1-11 and can include the first and second sets of parameters to include one or more of a value of determined number of pipes of the pipe structure, outside diameters of the determined pipes of the pipe structure, or thicknesses of the determined pipes of the pipe structure.

A system 13 can include elements of any of systems 1-12 and can include calculation of at least one buckling parameter to include determination of deformation, folding, tearing apart, or thickness change at each axial location of one or more pipes of the pipe structure.

A system 14 can include elements of system 3 and elements of any of systems 1-2 and 4-13 and can include determination of folding or tearing apart of a pipe to include determination of the folding or the tearing apart from an abrupt change in a value of the number of the pipes at a corresponding axial location.

A system 15 can include elements of system 1 or 3 and elements of any of systems 2 and 4-14 and can include the control circuitry being arranged to use the first and second sets of parameters at each axial location that satisfy a convergence condition to generate a formation compaction percentage at each axial location.

A system 16 can include elements of system 15 and elements of any of systems 1-14 and can include the control circuitry being arranged to generate a total formation compaction percentage by use of the formation compaction percentage at axial locations over a region along the length of a pipe structure.

A system 17 can include elements of system 16 and elements of any of systems 1-15 and can include the control circuitry being arranged to generate an average formation compaction percentage and an average total formation compaction percentage when the pipe structure is a multi-pipe structure.

A system 18 can include elements of any of systems 1-17 and can include the first and second forward models both being one dimensional.

A system 18 can include elements of any of systems 1-17 and can include one of the first and second forward models is one dimensional and the other is two or three dimensional.

In the conventional inversion algorithms for the pipe inspection, the output results are presented in the form of images of the tubing and casings and the thickness of these pipes assuming a certain pipe profile baseline. For example, the pipes are in perfect vertical configuration. As taught herein, inversion algorithms are implemented to detect and evaluate the deviations from this certain profile due to the buckling effects. Analysis of the casing condition is an important objective, as tubing/casings removal is both expensive and time consuming, particularly in offshore platforms. Using more accurate and faster inversion technologies leads to better interpretation of the integrity of the casings, which in turn leads to significant financial advantages during the production process.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:

1. A method comprising:
   making measurements of a pipe structure in a wellbore at a plurality of axial locations along a length of the pipe structure, generating measured responses at each of the axial locations, the pipe structure having a number of pipes;
   conducting, via control circuitry, operations for each axial location of the plurality of axial locations, the operations including:
   calculating a first misfit between the measured responses and modeled responses obtained from a first forward model based on a first set of parameters;
   calculating a second misfit between the measured responses and modeled responses obtained from a second forward model based on a second set of parameters; and
   calculating at least one buckling parameter, via the control circuitry, using the first and second sets of parameters for the plurality of axial locations; and
   storing, in a memory device, the first and second set of parameters from the operations for each axial location.

2. The method of claim 1, wherein calculating at least one buckling parameter comprises determining one or more of presence of buckling, amount of buckling, or type of buckling from the first and second sets of parameters.

3. The method of claim 1, further comprising:
   calculating a third set of parameters that is constructed by stitching together the first and second sets of parameters to form a single result,
   wherein the stitching includes selecting among first and second sets of parameters, the one that produces the smallest misfit among first and second misfits,
   wherein the third set of parameters includes a number of pipes, and calculating at least one buckling parameter includes determining a transition between a value of the number of pipes and another value of the number of pipes
   wherein the third set of parameters includes an eccentricity value, and calculating at least one buckling parameter includes determining a transition between a value of eccentricity and another value of eccentricity,
   wherein determining the transition between the value of eccentricity and another value of eccentricity includes comparing the difference between the first value of eccentricity and second value of eccentricity to an eccentricity threshold,
   wherein the third set of parameters includes a thickness characteristic and the method includes displaying the pipe structure using the thickness characteristic to represent one or more buckling effects or a formation compaction effect
   displaying on a display the third set of parameters, and
   wherein presence of buckling being determined as a discrepancy between a number of pipes in the well structure in a well plan and a value for a number of pipes in the first or second set of parameters.

4. The method of claim 1, wherein the method includes presence of buckling being determined as a discrepancy between a number of pipes in the well structure in a well plan and a value for a number of pipes in the first or second set of parameters.

5. The method of claim 1, wherein the first and second sets of parameters include one or more of a value of determined number of pipes of the pipe structure, outside diameters of the determined pipes of the pipe structure, or thicknesses of the determined pipes of the pipe structure.

6. The method of claim 1,
   wherein calculating at least one buckling parameter includes determination of deformation, folding, tearing apart, or thickness change at each axial location of one or more pipes of the pipe structure, and,
   wherein determining folding or tearing apart of a pipe includes determining the folding or the tearing apart from an abrupt change in a value of the number of the pipes at a corresponding axial location.

7. The method of claim 1, further comprising:
   using the first and second sets of parameters at each axial location that satisfy a convergence condition to generate a formation compaction percentage at each axial location;
   generating a total formation compaction percentage using the formation compaction percentage at axial locations over a region along the length of a pipe structure; and
   generating an average formation compaction percentage and an average total formation compaction percentage when the pipe structure is a multi-pipe structure.

8. The method of claim 1, wherein the first and second forward models are at least one of both one dimensional and one of the first and second forward models is one dimensional and the other is two or three dimensional.

9. A machine-readable storage device having instructions stored thereon, which, when executed by the control circuitry of a machine, cause the machine to perform operations, the operations comprising:
   making measurements of a pipe structure in a wellbore at a plurality of axial locations along a length of the pipe structure, generating measured responses at each of the axial locations, the pipe structure having a number of pipes;
   conducting, via the control circuitry, operations for each axial location of the plurality of axial locations, the operations including:
   calculating a first misfit between the measured responses and modeled responses obtained from a first forward model based on a first set of parameters;
   calculating a second misfit between the measured responses and modeled responses obtained from a second forward model based on a second set of parameters;
   calculating at least one buckling parameter, via the control circuitry, using the first and second sets of parameters for the plurality of axial locations; and
   using the first and second sets of parameters at each axial location that satisfy a convergence condition to generate a formation compaction percentage at each axial location; and
   storing, in a memory device, the first and second set of parameters from the operations for each axial location.

10. A machine-readable storage device of claim 9, wherein the operations comprise
generating a total formation compaction percentage using the formation compaction percentage at axial locations over a region along the length of a pipe structure; and
generating an average formation compaction percentage and an average total formation compaction percentage when the pipe structure is a multi-pipe structure.

11. A machine-readable storage device of claim 9,
wherein conducting, via control circuitry, operations for each axial location of the plurality of axial locations comprise:
calculating a third set of parameters, constructed by stitching together the first and second sets of parameters to form a single result,
wherein the operations comprise
generating a total formation compaction percentage using the formation compaction percentage at axial locations over a region along the length of a pipe structure; and
generating an average formation compaction percentage and an average total formation compaction percentage when the pipe structure is a multi-pipe structure.

12. A system comprising:
a tool having a set of transmitters to transmit one or more electromagnetic signals in a pipe structure at a plurality of axial locations, the pipe structure having a number of pipes around a reference axis such that the tool is arrangeable within the pipes;
a set of receivers of the tool to receive responses in response to exciting the pipe structure with the one or more electromagnetic signals;
control circuitry arranged to conduct operations for each axial location of the plurality of axial locations, the operations including:
calculation of a first misfit between the measured responses and modeled responses obtained from a first forward model based on a first set of parameters;
calculation of a second misfit between the measured responses and modeled responses obtained from a second forward model based on a second set of parameters; and
calculation of at least one buckling parameter using the first and second sets of parameters for the plurality of axial locations; and
a memory device to operatively store the first and second set of parameters from the operations for each axial location.

13. The system of claim 12, wherein the calculation of the at least one buckling parameter comprises determination of one or more of presence of buckling, amount of buckling, or type of buckling from the first and second sets of parameters.

14. The system of claim 12, the control circuitry is further arranged to, calculate a third set of parameters, constructed by stitching together the first and second sets of parameters to form a single result,
wherein the stitching includes selection, among first and second sets of parameters, of one that produces the smallest misfit among first and second misfits,
wherein the third set of parameters includes at least one of a number of pipes and an eccentricity value, and calculation of the at least one buckling parameter includes at least one of
a determination of a transition between a value of the number of pipes and another value of the number of pipes and
a determination of a transition between a value of eccentricity and another value of eccentricity, wherein determination of the transition between the value of eccentricity and another value of eccentricity includes a comparison of a difference between the first value of eccentricity and second value of eccentricity to an eccentricity threshold,
wherein the system includes a display on which to display the third set of parameters.

15. The system of claim 14, wherein the third set of parameters includes a thickness characteristic and the control circuitry is arranged to display the pipe structure using the thickness characteristic to represent one or more buckling effects or a formation compaction effect.

16. The system of claim 14, wherein the control circuitry is arranged to determine presence of buckling as a discrepancy between a number of pipes in the well structure in a well plan and a value for a number of pipes in the first or second set of parameters.

17. The system of claim 12,
wherein the control circuitry is arranged to determine presence of buckling as a discrepancy between a number of pipes in the well structure in a well plan and a value for a number of pipes in the first or second set of parameters, and
wherein the first and second sets of parameters include one or more of a value of determined number of pipes of the pipe structure, outside diameters of the determined pipes of the pipe structure, or thicknesses of the determined pipes of the pipe structure.

18. The system of claim 12,
wherein calculation of at least one buckling parameter includes determination of deformation, folding, tearing apart, or thickness change at each axial location of one or more pipes of the pipe structure and
wherein determination of folding or tearing apart of a pipe includes determination of the folding or the tearing apart from an abrupt change in a value of the number of the pipes at a corresponding axial location.

19. The system of claim 12, wherein the control circuitry is arranged to,
use the first and second sets of parameters at each axial location that satisfy a convergence condition to generate a formation compaction percentage at each axial location;
generate a total formation compaction percentage by use of the formation compaction percentage at axial locations over a region along the length of a pipe structure; and
generate an average formation compaction percentage and an average total formation compaction percentage when the pipe structure is a multi-pipe structure.

20. The system of claim 12, wherein the first and second forward models are at least one of both one dimensional and one of the first and second forward models is one dimensional and the other is two or three dimensional.

* * * * *